United States Patent Office.

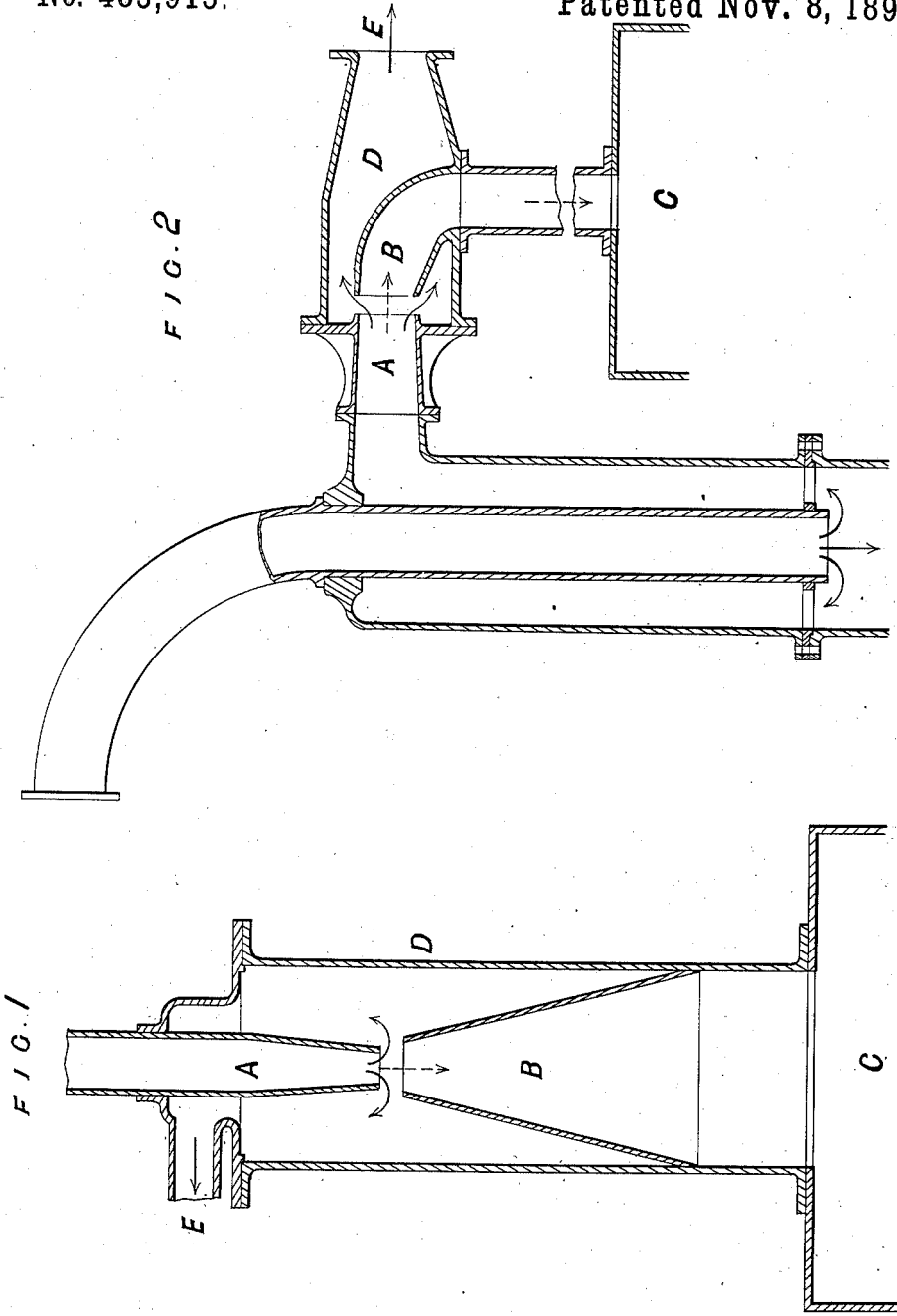

FREDERIC ELIOT DUCKHAM, OF LONDON, ENGLAND.

METHOD OF SEPARATING GRAIN AND DUST OR STIVE FROM AIR LADEN THEREWITH.

SPECIFICATION forming part of Letters Patent No. 485,915, dated November 8, 1892.

Application filed February 5, 1892. Serial No. 420,414. (No model.)

*To all whom it may concern:*

Be it known that I, FREDERIC ELIOT DUCKHAM, engineer, of Millwall Docks, London, England, have invented new and useful Improvements in Separating Grain and Dust or Stive from Air Laden Therewith, of which the following is a full, clear, and exact description.

My invention relates, essentially, to the separation of dust or stive from air laden therewith.

The invention is applicable in flour-mills for separating the dust or stive from the air coming from grain-milling machinery. It is also applicable to the air-current used in the pneumatic system of transferring grain, (from ships or in warehouses and other places,) hereinafter referred to, either with the object of enabling the grain and the dust mingled therewith to be deposited together or with the object of separating the dust (and any grain that may be carried off along with it) from the air-current which has been used for the pneumatic conveyance of the grain, the purpose in either case being to enable the current of air to disengage itself without carrying off any of the dust.

The invention is based on the difference of inertia of the solid and gaseous particles; and it consists, essentially, in causing the current of air laden with dust or "stive" or with grain and dust, as the case may be, to be projected into a closed receiver in such manner that while the solid particles will by virtue of their acquired momentum continue to move in the direction in which they are projected and be caused to penetrate the somewhat denser atmosphere of said receiver and become deposited therein the gaseous particles will be cushioned or arrested and conducted away in another direction without carrying off the dust.

In order that the action of gravity may assist the momentum of the solid particles in effecting their separation from the air, it is preferable, but not indispensable, that the current should be projected in a downward direction.

The invention will be described with reference to the accompanying drawings, which illustrate, in—

Figure 1, a central vertical sectional elevation of the preferred form of the apparatus. Fig. 2 is a similar section of the apparatus arranged horizontally and applied to the pneumatic system of conveying grain.

In carrying the invention into effect the stive-laden or grain and dust laden current of air is introduced through a pipe and projected downward in the form of a continuous jet from a nozzle A into a receiving-cone B, leading into a chamber or receiver C, which is closed or which leads only into another closed receiver. The smaller end of the receiving-cone is presented toward the jet-nozzle, and a short space intervenes between the nozzle and cone, across which the jet is projected, the velocity of the jet, the form and proportions of the cone, and the length of the intervening space being suitably proportioned to each other.

It may be mentioned that in separating the dust from the air which has been used for the pneumatic transmission of grain the nozzle velocity of the air-jet in an apparatus proportioned as shown in the drawings has been from twenty to thirty feet per second, and this has given good results. As, however, this velocity resulted from the conditions under which the air had been used for the pneumatic conveyance of grain—that is to say, as this velocity was not intentionally adopted for the purpose of separating the dust—it is probable that when this method is applied for separating stive from air coming from flour-mills a considerably lower velocity will suffice.

It is important that the area of the smaller end of the receiving-cone B should only exceed that of the jet so far as may be necessary to insure the whole of the stream of solid particles being received in the cone B, and that in proportion as the area of the cone is increased will be the penetration of the air-jet into the cone and the liability of eddies being formed therein and the carrying away with the air of some of the dust.

The nozzle A and cone B are contained in a casing D, inclosing an annular space around the jet-nozzle and connected by a pipe E with the exhauster, if one be used.

The momentum imparted by the air to the solid particles carries them across the interval between the jet-nozzle and cone and causes them to pass on through the cone B, as indicated by the dotted arrows, and be deposited in the closed receiver C, while the air escaping laterally becomes disentangled from the stream of solid particles and is then carried off to the exhauster. This separation of the solid and gaseous particles is probably due to their difference of inertia and to the slight plenum or dense atmosphere produced within the closed receiver C by the injected current of air, which is sufficient to resist the momentum of the gaseous particles, but is penetrable by the solid particles of matter contained in the jet.

It will be understood that the exhauster is used to impart the desired pressure and velocity to the air-current and that the invention is equally applicable if the air-pressure to produce the jet be obtained by air-compressing apparatus, in which case no exhauster need be used, the casing D discharging into the air, or it might be omitted entirely.

The solid particles collected in chamber C may be withdrawn from time to time by means of an oscillating receiver, (such as described in the specification of a previous patent, dated November 3, 1891, No. 462,539,) which would be arranged to work beneath the closed chamber C, the latter being hopper-shaped and discharging into the oscillating receiver in the manner described in the specification of my aforesaid patent.

Having now particularly described and ascertained the nature of the said invention and in what manner the same is to be performed, I declare that what I claim is—

The method of separating dust or grain and dust from an air-current, which consists in providing an atmosphere of greater density than the said air-current and in then causing the dust or grain and dust-laden current to be projected in the form of a jet across an open space into or against said atmosphere of greater density, whereby the dust or grain and dust are caused to separate from the said air-current, substantially as set forth.

FREDERIC ELIOT DUCKHAM.

Witnesses:
  WM. CLARK,
*Patent Agent, 53 Chancery Lane, London.*
  JOSEPH LAKE,
*17 Gracechurch Street, London, E. C.*